Sept. 9, 1930.                    W. H. JAYNE                    1,775,558
                                  BRUSH HOLDER
                              Filed April 30, 1930
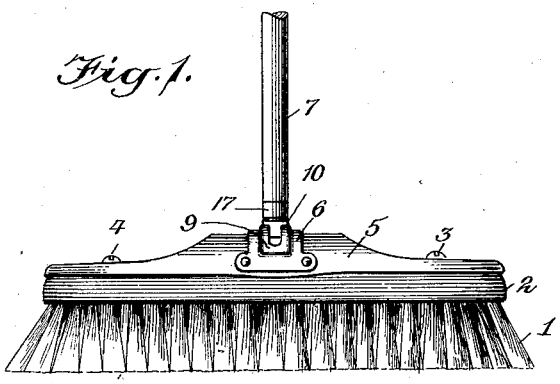
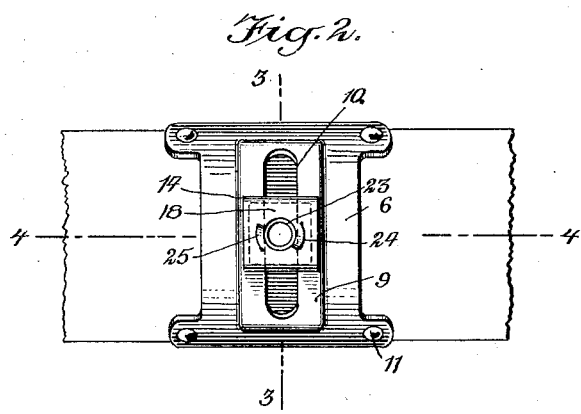
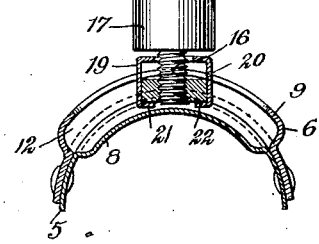
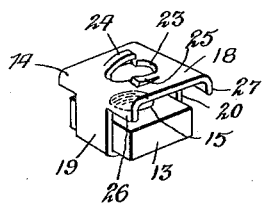
WITNESSES
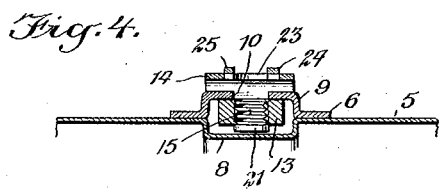
INVENTOR
Wade H. Jayne
BY Munn & Co.
ATTORNEYS Patented Sept. 9, 1930

1,775,558

UNITED STATES PATENT OFFICE

WADE H. JAYNE, OF BAYSIDE, NEW YORK

BRUSH HOLDER

Application filed April 30, 1930. Serial No. 448,657.

This invention relates to brush holders, and has for an object to provide an improved construction wherein the handle of the holder may be adjusted readily and locked in different adjusted positions without the use of tools.

Another object of the invention is to provide in a brush holder, a casing provided with a slotted plate and a sliding handle-receiving nut coacting with the plate so as to be moved by the handle into locking engagement with the plate.

A further object of the invention is to provide in a brush holder a casing having a pressed out portion coacting with a reinforcing slotted plate, whereby a nut-receiving recess is presented which acts to hold a nut in place ready to receive a handle, the slotted arrangement permitting the handle to be set at different angles.

In the accompanying drawings—

Figure 1 is a front view of a brush holder disclosing an embodiment of the invention, a brush being shown connected thereto;

Figure 2 is a fragmentary top view on a large scale showing the central portion of the holder shown in Figure 1, the handle being eliminated;

Figure 3 is a sectional view through Figure 2 on the line 3—3, a handle being shown in connection therewith;

Figure 4 is a fragmentary sectional view through Figure 2 on the line 4—4;

Figure 5 is an enlarged perspective view of a clamp and nut disclosing certain features of the invention.

Referring to the accompanying drawings by numerals 1 indicates a brush of any desired kind, this brush having a back 2 which is adapted to be secured to the holder through the use of screws 3 and 4. These screws extend through the casing 5, which casing carries a reinforcing and handle-supporting plate 6 whereby handle 7 may be properly connected in place.

The casing 5 preferably is of some thin sheet metal of a desired quality, and of a shape to snugly fit over the body 2 of brush 1, although the central part does not ordinarily contact with the body. If desired, the pressed down portion shown as section 8 may contact with the body 2, though this is not essential.

Coacting with the brush 1 is a plate 6 which is preferably formed of thicker and stronger metal than the casing 5. As illustrated in Figures 3 and 4, this plate is provided with a pressed up portion 9 having a slot 10 extending transversely of the body 5 and is connected to the casing 5 by rivets or other suitable means 11, whereby it braces and stiffens the body 5 and also covers the pressed down portion 8. The parts are arranged so that the pressed up portion 9 is opposite the pressed down portion 8 whereby a cavity or chamber 12 is provided for the nut or threaded member 13 and part of the clamp 14.

The threaded member 13 may be an ordinary square nut, if desired, but must be formed so as to be connected with clamp 14, and must also be provided with a threaded opening 15 for receiving the threaded extension 16 of handle 7.

Preferably the handle 7 is made of wood, whereas the extension 16 is a threaded rod embedded in the end of the wooden portion of the handle. A ferrule 17 fits over the end of the wooden portion of the handle so as to confine the same when the handle is screwed down tightly against the top plate 18 of clamp 14.

As illustrated in Figure 5, clamp 14 is formed with a top plate 18 and depending side members 19 and 20, these side members having in-turned flanges 21 and 22 underlying the threaded member or nut 13, whereby this threaded nut is held in position for engaging the under surface of the raised section 9. Plate 18 is provided with an aperture 23 through which extension 16 projects when in use, and with a pair of pressed up locking spurs 24 and 25. These spurs extend in opposite directions and also in a direction whereby the end of the handle 7 will readily slip thereover when being screwed down, but will engage the ends thereof when being unscrewed. This is somewhat in the nature of a lock washer but is made integral with the plate 18 in order to always be in place and properly positioned to lock the handle to the clamp 14.

As the extension 16 is screwed down tight the depending edges 26 and 27 of clamp 14 will be pressed against the outer surface of section 9, while nut 13 will be pressed against the under surface.

When the parts are loose the handle 7 may be swung to any desired angle by sliding the clamp 14 and associated parts along the slot 10. When the handle 7 has been placed at the desired angle it is screwed down tight and the pressed out portion or spurs 24 and 25 will resist strongly any unscrewing of the parts.

After the parts have been tightened the handle 7 can be forced in a reverse direction, but the spurs 24 and 25 would dig into and mutilate the end thereof. Ordinarily if an adjustment is desired after the handle 7 has been screwed down tightly, a hammer is used against clamp 14 and by tapping or striking clamp 14 a desired adjustment may be secured. After this has been done preferably the handle 7 is screwed down a little further to take care of any looseness produced by this adjustment.

What I claim is:

1. A brush holder, comprising a casing adapted to receive a brush, a slotted plate rigidly secured to the outer surface of said casing, a sliding clamp coacting with said plate with part thereof interlocking with the plate, said clamp having locking spurs, and a handle adapted to be screwed into said clamp and engage said locking spurs.

2. A brush holder including a casing adapted to receive part of the back of a brush, means extending through the casing for clamping the brush to the casing, a stiffening and holding plate rigidly secured centrally of said casing, a clamping member carried by said plate, said clamping member having a threaded part and a handle having a threaded extension, said threaded extension being adapted to be screwed into said threaded part, whereby the handle will be secured in place.

3. A brush holder including a hollow casing formed with a depressed central portion, a stiffening and holding plate secured to said casing exteriorly and extending over said depression, said plate having a slot, a clamping member slidingly mounted on said plate with a portion above and a portion below the plate and with a part extending through said slot, the portion arranged below said plate being threaded and capable of movement independent of said plate, and a handle having a threaded extension adapted to be screwed into said threaded part for pressing the same against said plate for locking said clamp in place and securing the handle to the casing.

4. A brush holder including a casing formed as a shell, means for connecting the brush to said casing, a plate rigidly secured to said casing centrally, said plate having a raised slotted section, a clamp slidingly mounted on said slotted section, said clamp having a portion resting on top of said slotted section, and a threaded nut arranged immediately below said slotted section, said nut being movable towards the said slotted section, and a handle having a threaded extension, said threaded extension being adapted to be interlocked with said nut for pulling the nut towards said slotted section, and also securing the handle in place.

5. A brush holder including a casing adapted to receive a brush, a plate having a slotted section, said plate being rigidly secured to said casing, a handle, and means for adjustably connecting said handle to the plate, said means including a clamp having locking spurs coacting with said handle, said clamp having the upper part resting on the plate, a threaded nut arranged below said plate and carried by said clamp, a handle having a threaded extension, said threaded extension being adapted to engage said clamp, and said nut, whereby when the handle is rotated in one direction said clamp will be forced against the upper surface of said plate and said nut will be forced against the inner surface of said plate, while said spurs will act to resist the reverse rotation of said handle.

6. In a brush holder, means for clamping a handle in place, said means comprising a clamping structure formed with a top plate having a pair of spurs extending in opposite directions, a depending encircling portion, and a threaded nut held in place by said depending encircling portion.

WADE H. JAYNE.